US007663761B2

(12) United States Patent
Hacker et al.

(10) Patent No.: US 7,663,761 B2
(45) Date of Patent: Feb. 16, 2010

(54) BEAM ANALYZING SYSTEM AND METHOD FOR ANALYZING PULSED PARTICLE OR LASER BEAMS

(75) Inventors: Kirsten Hacker, Hamburg (DE); Florian Löhl, Hamburg (DE); Holger Schlarb, Hamburg (DE); Manfred Wendt, Batavia, IL (US)

(73) Assignee: Dutsches Elektronen-Synchrotron Desy (DE)

( * ) Notice: Subject to any disclaimer, the term of this patent is extended or adjusted under 35 U.S.C. 154(b) by 353 days.

(21) Appl. No.: 11/748,981

(22) Filed: May 15, 2007

(65) Prior Publication Data

US 2008/0116389 A1 May 22, 2008

(30) Foreign Application Priority Data

Nov. 16, 2006 (DE) .................. 20 2006 017 713 U

(51) Int. Cl.
*G01B 9/02* (2006.01)
*G01J 1/00* (2006.01)
*G02B 27/32* (2006.01)

(52) U.S. Cl. ........................ 356/450; 356/121; 356/256

(58) Field of Classification Search ................. 356/121, 356/256, 450, 484; 250/393
See application file for complete search history.

(56) References Cited

U.S. PATENT DOCUMENTS 4,871,250 A * 10/1989 Koseki ........................ 356/121
5,007,717 A * 4/1991 Cutolo et al. ............... 359/328
6,115,126 A * 9/2000 Chen et al. .................. 356/520
6,496,261 B1 * 12/2002 Wilsher et al. .............. 356/450
2006/0119855 A1 * 6/2006 Li .............................. 356/450
2007/0171422 A1 * 7/2007 Birge et al. ................. 356/450

* cited by examiner

*Primary Examiner*—Michael A Lyons
(74) *Attorney, Agent, or Firm*—Hovey Williams LLP

(57) ABSTRACT

The present invention relates to a beam analyzing system and a method for analyzing pulsed particle or laser beams. The inventive beam analyzing system comprises a detector unit, a unit for generating a pulsed reference laser beam, a first electro-optical modulator and a first read-out photo detector, wherein the optical input of the first electro-optical modulator is connected with the unit for generating a pulsed reference laser beam, wherein the optical output of the first electro-optical modulator is connected with the first readout photo detector and wherein the signal input of the first electro-optical modulator is connected with the detector unit. In the inventive method for analyzing a pulsed particle or laser beam first voltage pulses are generated by means of a detector unit, the intensity of a pulsed reference laser beam is modulated by the first voltage pulses, the intensity of the modulated reference laser pulses is measured and the phasing of the first voltage pulses relative to the reference laser pulses is deduced from the intensity of the modulated reference laser pulses.

21 Claims, 5 Drawing Sheets

BEAM ANALYZING SYSTEM AND METHOD FOR ANALYZING PULSED PARTICLE OR LASER BEAMS

CROSS REFERENCE TO RELATED APPLICATION

This application claims priority of German Application Serial No. 20 2006 017 713.2, filed Nov. 16, 2006, which is hereby incorporated by reference herein.

BACKGROUND OF THE INVENTION

1. Field of the Invention

The present invention relates to a beam analyzing system and a method for analyzing pulsed particle or laser beams.

2. Discussion of Prior Art

In accelerator machines in which a pulsed beam (particle or laser beam) is used the exact determination of the position of a beam pulse in time and space as well as the determination of the energy of the beam pulses is of major importance. For example, in a free electron laser a pulsed electron beam is used to generate pulses of coherent light in a so-called undulator installed at the end of the course of beam. For this purpose the electron beam is steered on a sinusoidal path in the undulator by magnetic fields, such that coherent light is emitted into the forward direction of the electron beam. By virtue of the pulsed electron beam this coherent light is also pulsed.

In experiments with free electron lasers these pulsed characteristics are for example used to conduct measurements of ex-cited states of atoms or molecules, wherein the excited states are initially generated by a pulse of an excitation laser. In experiments of this kind the time between the excitation pulse on the one hand and the pulse of the free electron laser on the other hand is selectively varied to thereby determine properties of excited states, such as decay times.

It results from this that it is of major importance for experiments of this kind to know the exact timing of the beam pulses relative to a pulsed reference signal, wherein a pulsed laser beam may be used as reference signal.

In the following, this timing is referred to as "phasing" of the beam pulses.

Moreover, the spatial position of the particle beam is also of interest as in certain sections of the accelerator a variation of the transverse position corresponds to a variation in energy. An exact determination of the energy of the particle beam can therefore in those sections be accomplished by a precise measurement of the transverse position of the particle beam.

From the prior art it is known to use an antenna in a beam pipe section for the determination of the timing of the particle beam. By means of the beam pulse a voltage pulse is induced in the antenna and e.g. conducted through a band pass filter and amplified afterwards. The amplified signal is mixed with a reference signal in an HF-mixer to a lower frequency. The phase information is then extracted from the low-frequency signal.

It is disadvantageous about a system of this kind that the mixed output signal is inter alia affected by variations of the frequency or the phase of the reference signal, thus a drift appearing in the reference signal leads to the output signal varying independently from the timing of the beam pulse. Due to the fact that just a small frequency band of the electrode signal is analyzed the signal levels are in addition low, which limits the resolution of this method.

For the measurement of the arrival time of laser beam pulses a method for determining the cross-relations between a reference laser beam and a laser beam to be analyzed by means of a frequency-doubling crystal is known from the prior art. However, it is a major disadvantage that there is not a suitable crystal for any combination of a reference laser with a laser beam to be analyzed available, e.g. in the UV-domain or at too low power outputs.

SUMMARY OF THE INVENTION

Starting form the prior art, it is therefore the object of the present invention to provide a system and a method for analyzing a beam, such that the timing and the spatial position of a particle or laser beam pulse as well as its energy can be determined with a high precision and without the disadvantages described above.

According to a first aspect of the present invention, this object is solved by a beam analyzing system including a detector unit, a unit for generating a pulsed reference laser beam, a first electro-optical modulator and a first readout photo detector, wherein the optical input of the first electro-optical modulator is connected with the unit for generating a pulsed reference laser beam, wherein the optical output of the first electro-optical modulator is connected with the first read-out photo detector and wherein the signal input of the first electro-optical modulator is connected to the detector unit.

Using the beam analyzing system according to the invention it is exploited in case of a particle beam that a signal pulse generated during the passage of a particle pulse by an electrode arrangement serving as the detector unit arranged at a beam pipe section is used to modulate the intensity of one or more pulses of the pulsed reference laser beam in the first electro-optical modulator.

Provided that the voltage pulse of the detector unit has a reference point such as a zero-point that lies in the range of the pulse where the voltage changes heavily, the timing of the reference point relative to the reference laser pulse can be deduced from the modulated intensity of the reference laser pulse. In case of a laser beam a photo detector serves as the detector unit arranged such that a voltage pulse is generated if a laser pulse hits it. Apart from that the functionality is the same.

In general, the following method for measuring the timing of a pulsed beam relative to a reference signal can be conducted. A pulsed reference laser beam is used as the reference signal and fed into a modulation system. Furthermore, a voltage pulse of a detector unit interacting with the particle or laser beam is conducted as a control signal to the modulation system, wherein the voltage pulse is induced when a particle or laser beam pulse passes or hits, respectively, the detector unit. The modulation system modulates the intensity of the pulses of the reference laser beam dependent on the phasing of the volt-age pulses relative to the reference laser pulses, such that the intensity of the reference laser pulses is a measure for the relative phasing.

By this the advantage arises that, if the pulsed reference laser beam is used to synchronize the whole accelerator machine or the laser system, respectively, this optical signal used for the synchronization can directly be used to determine the timing of the particle or laser beam pulses.

Furthermore, the beam analyzing system according to the present invention enables for instance to measure the arrival time of a particle or laser beam pulse relative to the reference signal with significantly higher resolution compared to the prior art. A resolution of up to 10 fs is reached by this.

Within the scope of the present invention a "beam pipe section" relates to a portion generally under vacuum condition through which a beam pulse of a particle or laser beam is directed. This can be a conventional beam pipe section or a resonator cavity of the accelerator section. In case of a laser beam a beam pipe is not necessary in this sense, nevertheless a laser beam can be directed through a beam pipe. In addition, a photo detector in terms of the present invention relates to a unit that, upon a hit of a light pulse, generates an electric signal of which the intensity corresponds to that of the light pulse. For instance, this can be a photo diode, a photo transistor or a photo multiplier. Finally, "connection" between two or more components of the system or two or more components of the system "connected" means within the scope of the present invention that these components comprise an electrical, optical or other connection suitable for a signal transport.

According to an embodiment of the invention there is a first delay unit interposed between the unit for generating a pulsed reference laser beam and the optical input of the first electro-optical modulator for adjusting a delay time for the pulsed reference laser beam. This has the advantage that the system can be adjusted to the voltage pulse generated by the detector unit, such that, when the particle or laser beam pulse has the desired phasing relative to the reference laser pulse, a zero-point of the voltage pulse coincides in the electro-optical modulator with a reference laser pulse.

Preferably, the electro-optical modulator is adjusted such that the intensity of the reference laser pulse output by the modulator is lowered to a defined pre-adjusted level when then voltage at the signal input is zero and raised or lowered with respect to this pre-adjusted level dependent on the impressed voltage.

Thereby, a deviation from the desired phasing causes a deviation in the intensity at the optical output of the electro-optical modulator with respect to the pre-adjusted level, wherein this deviation is a direct measure for the shift in the phasing.

If the system is, according to a preferred embodiment of the invention, to detect the arrival time of a particle beam pulse, the detector unit in form of an electrode arrangement arranged in a beam pipe section preferably comprises an annular bracket and electrode members, wherein the electrode members are electrically insulated with respect to the bracket. Furthermore, radial bores are provided in the annular bracket, wherein the electrode members are formed as bolts extending inside the bores and wherein the portion of the bolts facing the particle beam comprises an essentially constant diameter. Finally, the bolts are retained by insulating bushes in the bores.

Such an arrangement makes sure that the voltage pulse output by the electrode system has a range about the zero-point that is monotonously rising or falling and comprises a high gradient. The latter has the advantage that an intensity deviation of the laser pulse output at the output of the electro-optical modulator with respect to the pre-adjusted level arises al-ready at a small phase shift. So, with this preferred embodiment of the invention a high precision of the determination of the phase shift can be achieved.

As an alternative to the above-mentioned detection of the arrival time of particle beam pulses another preferred embodiment of the invention can also be used to determine the spatial position of the particle beam pulse perpendicular to the beam direction in a beam pipe section.

With this the electrode system comprises an electrode member extending transversely with respect to the direction of the particle beam pulses and comprising first and a second end portion. Furthermore, there is a second electro-optical modulator and a second readout photo detector provided, wherein the optical input of the second electro-optical modulator is connected with the unit for generating a pulsed reference laser beam and the optical input of the second electro-optical modulator is connected with the second readout photo detector. Finally, the first end portion of the electrode element is connected with the signal input of the first electro-optical modulator and the second end portion of the electrode element is connected with the signal input of the second electro-optical modulator.

Moreover and preferably, there is a second delay unit arranged between the unit for generating a pulsed reference laser beam and the optical input of the second electro-optical modulator for adjusting a delay time for the pulsed reference laser beam. This enables, as already for the determination of the arrival time, to adjust the position of the laser pulses relative to the voltage pulses output by the electrode system.

If the system is, according to a preferred embodiment of the invention, to detect the arrival time of a laser beam pulse, a photo detector serves as the detector unit, which is arranged such that a laser beam pulse hits it completely or partially and a voltage pulse is thereby generated. The faster the photo detector is the steeper is the voltage pulse. As described above, by means of a delay unit put in place upstream the relative position of the reference laser pulse can be adjusted such that a steep shoulder of the voltage pulse is sampled. The arrival time of the laser beam to analyze can then be deduced from the deviation of the amplitude of the reference laser beam pulse at the output of the electro-optical modulator.

With this, fluctuations in the amplitude of the laser beam to be analyzed are problematical. These would be misinterpreted as a shift in the arrival time using the system described above. This can be corrected by splitting up the reference laser beam and sampling the early shoulder as well as the late shoulder of the voltage pulse by means of two electro-optical modulators and two delay units that are put in place upstream with respect to the two electro-optical modulators, respectively.

Therefore, there are a second electro-optical modulator and a second readout photo detector provided in another embodiment of the inventive beam analyzing system, wherein the optical input of the second electro-optical modulator is connected with the unit for generating a pulsed reference laser beam and the optical output of the second electro-optical modulator is connected with the second readout photo detector. In addition, the signal output of the photo detector is connected with the signal inputs of the first electro-optical modulator and the second electro-optical modulator, respectively.

With this embodiment of the invention amplitude fluctuations of the laser beam to be analyzed lead to symmetrical amplitude fluctuations of the two reference laser pulses which can be well separated from shifts in the arrival time of the laser beam to be analyzed that lead to asymmetrical amplitude shifts of the two reference laser pulses.

According to a second aspect of the invention the above-mentioned object is achieved by a method for analyzing a pulsed particle or laser beam,

- wherein first voltage pulses are generated by means of a detector unit,
- wherein the intensity of a pulsed reference laser beam is modulated with the first voltage pulses,
- wherein the intensity of the modulated reference laser pulses is measured and
- wherein the phasing of the first voltage pulses relative to the reference laser pulses is deduced from the intensity of the modulated reference laser pulses.

In the inventive method the pulsed reference laser that is used as the reference signal beam is modulated by the voltage pulse that may serve as a control signal from the detector unit. In particular, when a particle or laser beam passes or hits, respectively, the detector unit the intensity of the pulses of the reference laser beam are modulated dependent on the phasing of the voltage pulse relative to the reference laser pulses. Thereby, the measured intensity of the reference laser pulses is a measure for the relative phasing between the voltage pulses and the reference laser pulses.

The inventive method has the advantage, that in case the pulsed reference laser beam is, as already mentioned, used to synchronize the complete accelerator system or the laser system, respectively, this optical signal used for the synchronization can directly be used for the determination of the timing or, where applicable, the spatial position of the particle or laser beam, such that a very precise measurement is made possible. With this, resolutions of up to 10 fs are yielded. Furthermore, using a preferred embodiment of the inventive method, in case of a laser beam to be analyzed, the phasing of an accelerator field for the particles as well as the amplitude thereof can be determined with a high precision.

Preferably, a nominal value of the phasing of the pulsed reference laser beam relative to the pulsed particle or laser beam is adjusted. This can for example be accomplished by means of a delay unit downstream with respect to a unit for generating a pulsed reference laser beam, which makes it possible that the system can be adjusted to the voltage pulse generated by the detector unit, such that if the particle or laser beam has the desired phasing with respect to the reference laser pulse corresponding to the nominal value a zero-point of the voltage pulse coincides with a reference laser pulse during the modulation, such that the reference laser pulse is in this case modulated in intensity as it is given for a voltage of 0 Volts.

In case of analyzing a particle beam an electrode system may serve as a detector unit. The voltage pulse generated by the electrode system may either be induced by the pulsed particle beam itself if the electrode system is arranged in a conventional beam pipe section or else by an accelerator field if the electrode system is arranged at a resonator. In the latter case the pulses have sinusoidal shape.

In another preferred embodiment of the method for analyzing a particle beam the transversal position of the particle beam in the beam pipe section can be determined. The transversal position can be a measure for the energy of the particle pulses.

There, the electrode system arranged in a beam pipe section comprises an electrode element extending transversely with respect to the particle beam direction and having a first and a second end, and at both ends of the electrode element a voltage pulse is output when a particle beam passes the electrode system. The pulsed reference laser beam is split up into a first pulsed reference laser beam and a second pulsed reference laser beam and the intensity of the first pulsed reference laser beam is modulated by the first voltage pulses as well as the intensity of the second pulsed reference laser beam is modulated by the second voltage pulses. The intensities of the modulated reference laser pulses are acquired, wherein the phasing of the first voltage pulses relative to the first reference laser pulses are determined from the intensity of the modulated by the first reference laser pulses and the phasing of the second voltage pulses relative to the second reference laser pulses are determined from the intensity of the modulated by the second reference laser pulses.

Also in this electrode system the voltage pulses comprise a zero-point and a monotonously rising or falling range about the zero-point. The system can be adjusted such that in both electro-optical modulators the zero-point coincides with a reference laser pulse when the beam pulse pass through the beam pipe section in longitudinal direction at a transversal reference position. In this case the intensity of the laser pulses in both modulators is not modulated with regard to the pre-adjusted level.

Provided though that the beam pulse passes through the beam pipe section in longitudinal direction at a transversal position different from the reference position the zero-points do not coincide with the reference laser pulse as the voltage pulses output at the ends are shifted with respect to those which are induced when the beam pulse pass through the beam pipe section at the transversal reference position. This time shift of the voltage pulse results in turn in that the laser pulses in the electro-optical modulator are then modulated with regard to the pre-adjusted level, wherein the variation of the intensity is a measure for the displacement of the transversal position of the beam with respect to the reference position.

There, first and/or second delay units may serve on the one hand to define the transversal reference position by adjusting a first and/or a second nominal value of the phasing of the first and/or reference laser pulses relative to the particle beam, respectively. On the other hand, the delay units serve to account for the phasing of the beam pulses relative to the reference laser beam in such a way that the zero-points of the voltage signals actually coincide with the laser pulses when the beam passes through the beam pipe section at the transversal reference position. Therefore, using the delay units a possible shift in the phasing can also be accounted for.

In case of an electrode system serving as a detector unit being arranged at a resonator that provides an accelerator field for a particle beam, also the phasing and the amplitude of the accelerator field can be determined. If the electrode system is arranged at a resonator it detects the accelerator field itself and a voltage signal can be tapped thereof which is proportional to the accelerator field and in particular to the timing shape thereof and can be fed in to the electro-optical modulators.

Given that the frequency of the pulsed reference signal is not an integer multiple of the frequency of the accelerator field or a fraction thereof a laser pulse coincides with the voltage signal having a different phasing with respect to the accelerator field, respectively. Thereby, each laser pulse samples a different point in the range of one wave length of the accelerator field, such that those modulated intensities output by the modulator contain an information about the phase and the amplitude of the accelerator field. In case the frequency of the reference signal is below that of the accelerator field, this can be referred to as “undersampling”.

For analyzing a laser beam a photo detector as detector unit is arranged such that laser beam pulses hit partially or fully the active surface of the photo detector and corresponding voltage pulses are generated.

In a preferred embodiment of the method for analyzing a laser beam a photo detector serves as a detector unit that is arranged such that a laser beam pulse hits partially or fully the active surface of it and a voltage pulse is generated thereby. As described above, using the delay units put in place upstream the relative position of the reference pulses can be adjusted such that a steep shoulder of a voltage pulse is sampled. From the variations of the amplitude of the reference laser pulses at the output of the electro-optical modulator the arrival time of the laser beam to be analyzed can then be deduced.

In order to prevent misinterpretations of amplitude fluctuations of the laser beam to be analyzed as shifts in the arrival time, the pulsed reference laser beam is, in another preferred embodiment of the method, wherein the voltage pulses generated by the laser beam in the photo detector comprise a first and a second shoulder, split up into a first pulsed reference laser beam and a second pulsed reference laser beam. The phasing of the first pulsed reference laser beam is adjusted such that the first shoulder of the voltage pulse is sampled and the phasing of the second pulsed reference laser beam is adjusted such that the second shoulder of the voltage pulse is sampled. The intensity of the first pulsed reference laser beam and the second pulsed reference laser beam is modulated by the first and the second voltage pulses, respectively, wherein the intensities of the modulated reference laser pulses are measured. The phasing of the first voltage pulses relative to the first reference laser pulses is determined from the intensity of the modulated first reference laser pulses and the phasing of the second voltage pulses relative to the second reference laser pulses is determined from the intensity of the modulated second reference laser pulses.

Thus, the reference laser beam is split up and the voltage pulses sampled at the early shoulder as well as at the late shoulder by means of two electro-optical modulators and delay units put in place upstream with respect to those. Amplitude fluctuations of the laser beam to be analyzed result in symmetrical amplitude fluctuation of both reference laser pulses and can be well separated from shifts in the arrival time of the laser beam to be analyzed which result in asymmetric amplitude variations in both reference laser pulses.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 1:
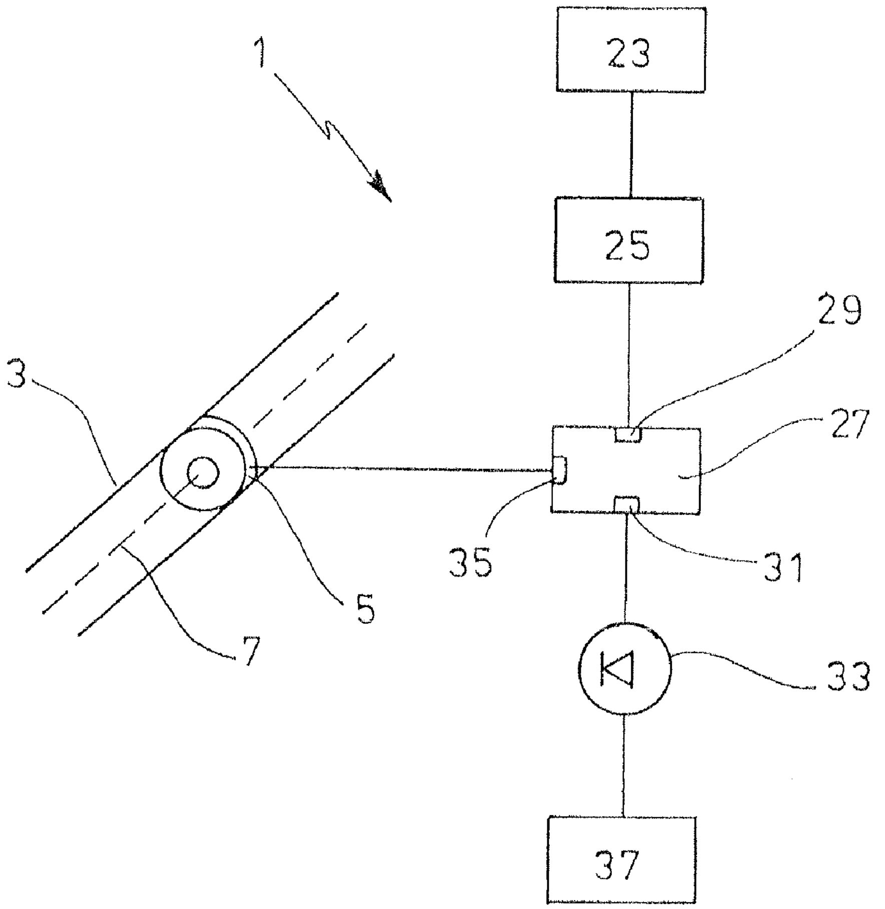
FIG. 1 shows a first preferred embodiment of the inventive beam analyzing system for analyzing a particle beam.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

FIG. 1 shows a first embodiment of an inventive beam analyzing system 1 that is arranged in a beam pipe section 3 of an accelerator system which produces a pulsed particle beam.

The beam analyzing system 1 comprises an electrode system 5 that is arranged in the beam pipe section 3. There, the electrode system 5 is set up such that a voltage pulse is induced when the electrode system 5 is passed by a beam pulse that runs through the beam pipe section 3 along the beam axis 7.

Figure 2:
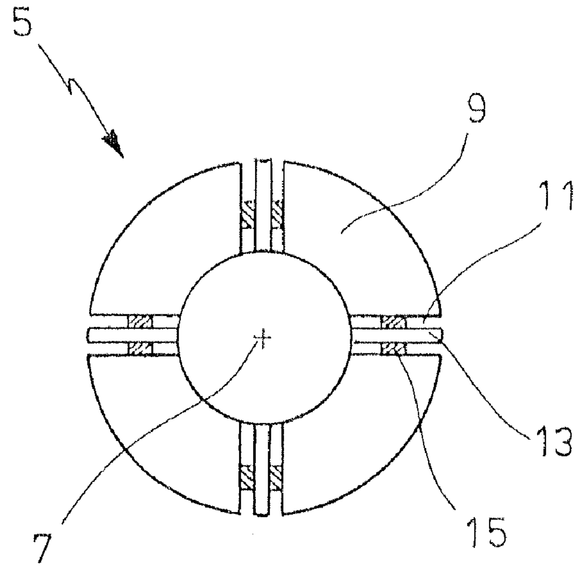
FIG. 2 shows an enlarged view of the used electrode system of the embodiment of FIG. 1.

In this embodiment the electrode system 5 has the setup shown in FIG. 2. There, the electrode system 5 comprises an annular bracket 9 that is provided with four radial bores 11. In the bores 9 there are bolts 13 arranged that serve as electrode elements. There, the bolts 13 are cylindrically designed and have an essentially constant diameter over their length. In particular, the portion of the bolts 13 facing the beam axis 7 is designed such that is has an essentially constant diameter. The bolts 13 are fixed in the bores 11 by an insulating bush 15 such that the bolts 13 are on the one hand electrically insulated with respect to the bracket 9, and therewith to the beam pipe section 3, and on the other hand ingested vacuum-tightly into the bracket 9.

By this, the electrode elements in form of the bolts 13 are arranged on the inner surface of the annular bracket 9. Additionally, this setup of the electrode system 5 results in that a voltage pulse is induced when the bolts 13 of the electrode system 5 are passed by a beam pulse that runs along the beam axis 7.

Figure 3:
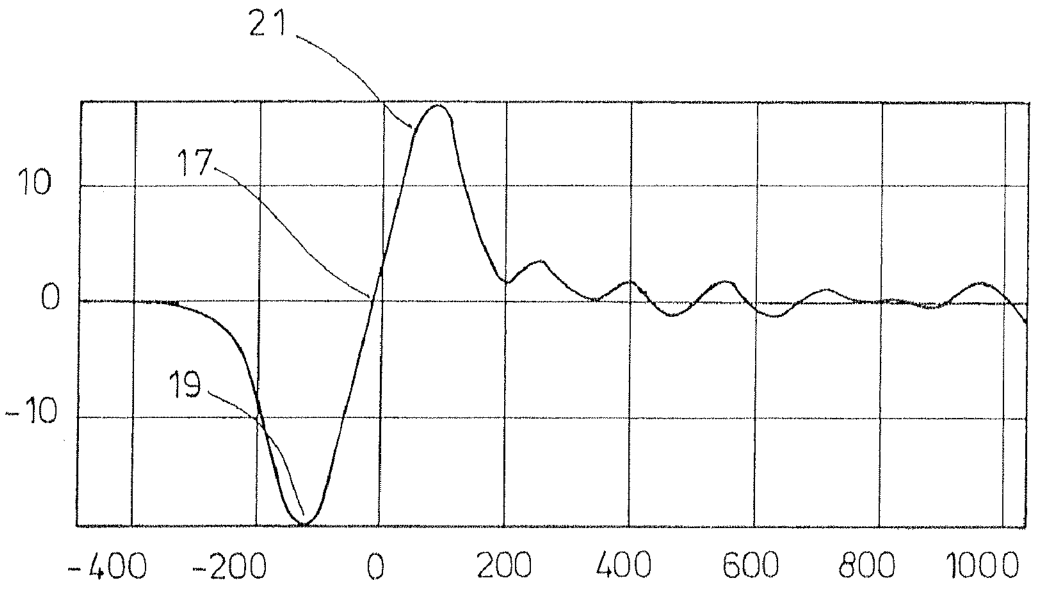
FIG. 3 shows a graph of the timing of a voltage pulse output by an electrode system.

In particular, the electrode system shown in FIG. 2 has the advantage that the voltage pulse that is induced during the passing of a beam pulse has the shape shown in FIG. 3. There, the voltage pulse comprises a zero-point 17 and a range about the zero-point 17 between the points 19 and 21 in which the signal rises monotonously and with a relatively high gradient so. Alternatively, the voltage pulse could also fall monotonously in the range about the zero-point 17 between the points 19 and 21 and with a relatively high gradient so.

As furthermore follows from FIG. 1, the beam analyzing system 1 comprises a unit 23 for generating a pulsed reference laser beam. For that, a mode-coupled fiber laser may be used. Via an optical link the unit 23 is connected with a delay unit 25 that serves for being able to adjust a delay time for the pulsed laser beam provided by the unit 23. There, the delay unit 25 may be designed such that the optical distance that a laser pulse needs to cover inside the delay unit 25 can be varied mechanically. The delay unit 25 allows for adjusting a nominal value of the phasing of the pulsed reference laser beam relative to the pulsed particle beam.

An electro-optical modulator 27 is arranged downstream with respect to the delay unit 25 wherein the delay unit 25 is connected with the optical input 29 of the modulator 27. The optical output 31 of the modulator 27 is connected to a read-out photo detector 33 for measuring the intensity of the reference laser pulses, wherein a photo detector in this regard refers in terms of the present invention to an element that generates an electrical signal upon a hit by a light pulse where the strength of the electrical signal corresponds to the intensity of the light pulse. Preferably, InGaAs photo diodes are deployed as photo detectors.

Finally, the bolts 13 of the electrode system 5 are connected with the signal input 35 of the electro-optical modulator 27 such that the voltage pulse induced by a beam pulse may result in a modulation of the intensity of the laser pulses generated by the unit 23.

Moreover, a signal processing unit 37, for example in form of an analogue-digital converter, is arranged downstream with respect to the readout photo detector 33.

Figure 4:
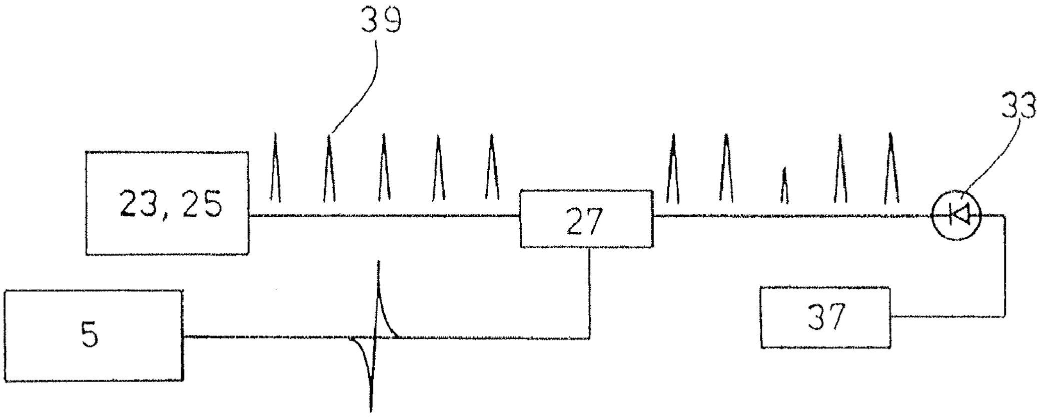
FIG. 4 shows a schematic illustration of the method for analyzing a beam using the electrode system for analyzing a particle beam according to the embodiment of FIG. 1.

The beam analyzing system 1 described above can be used in the following way to determine the arrival time of a beam pulse at the electrode system 5, wherein FIGS. 3 and 4 are particularly referred to.

The unit 23 generates reference laser beam pulses 39 with a frequency that is significantly higher than that the accelerator system produces beam pulses with. But this is not necessarily the case. There, the delay unit 25 is initially adjusted such that a reference point such as a zero-point 17 of a voltage pulse induced by a beam pulse coincides at the electro-optical modulator 27 with a laser pulse 39 when the beam pulse has the desired phasing relative to the reference laser signal. By this, a nominal value of the phasing of the reference laser beam relative to the pulsed particle beam is adjusted.

Preferably, the modulator 27 is adjusted such that the intensity of the laser pulses output at the optical output 31 has a pre-adjusted level, for example 50% of the maximum level, when a voltage of 0 Volts is present at the signal input 35. However, if a positive or negative voltage is present the intensity is raised or lowered with respect to the preadjusted level.

Therewith, such an adjustment results in that the laser pulse going into the optical input 29 of the modulator 27 is not modulated in its intensity with respect to the pre-adjusted level when a beam pulse has the exactly the desired phasing corresponding to the nominal value. Thus, the laser pulses 39 are detected at the readout photo detector 33 with non-modulated intensity.

In case the beam pulse has not the desired phasing the zero-point 17 of the voltage pulse does not coincide with a laser pulse 39. The laser pulse 39, as seen in FIG. 3, is rather positioned either between the points 17 and 19 or 17 and 21 depending on whether the beam pulse arrives early or late at the electrode system 5.

In both cases the intensity of the laser pulses 39 is modulated with respect to the pre-adjusted level because of the voltage of the voltage signal differing from zero, wherein this modulation is measured by the readout photo detector 33 and processed further by the signal processing unit 37. There, the modulation is a direct measure for the shifting of the phasing with respect to the desired value because of the monotonously rising shape of the voltage signal between the points 19 and 21.

Here, the chosen electrode system 5 shown in FIG. 2 is advantageous because it yields a monotonously rising or falling signal shape with a high gradient.

According to a preferred embodiment of the beam analyzing system the following method may therefore be performed for determining the timing of the pulsed particle beam relative to a reference signal. A pulsed reference laser beam that is used as the reference signal is fed into a modulation system. As a control signal a voltage pulse of an electrode system arranged in a beam pipe section is conveyed to the modulation system, wherein the voltage pulse is induced when a beam pulse passes the electrode system. By means of the modulation system the intensity of the pulses of the reference laser beam are modulated depending on the phasing of the voltage pulses relative to the laser pulses. Therewith, the intensity of the laser pulses is a measure for the relative phasing.

Figure 5:
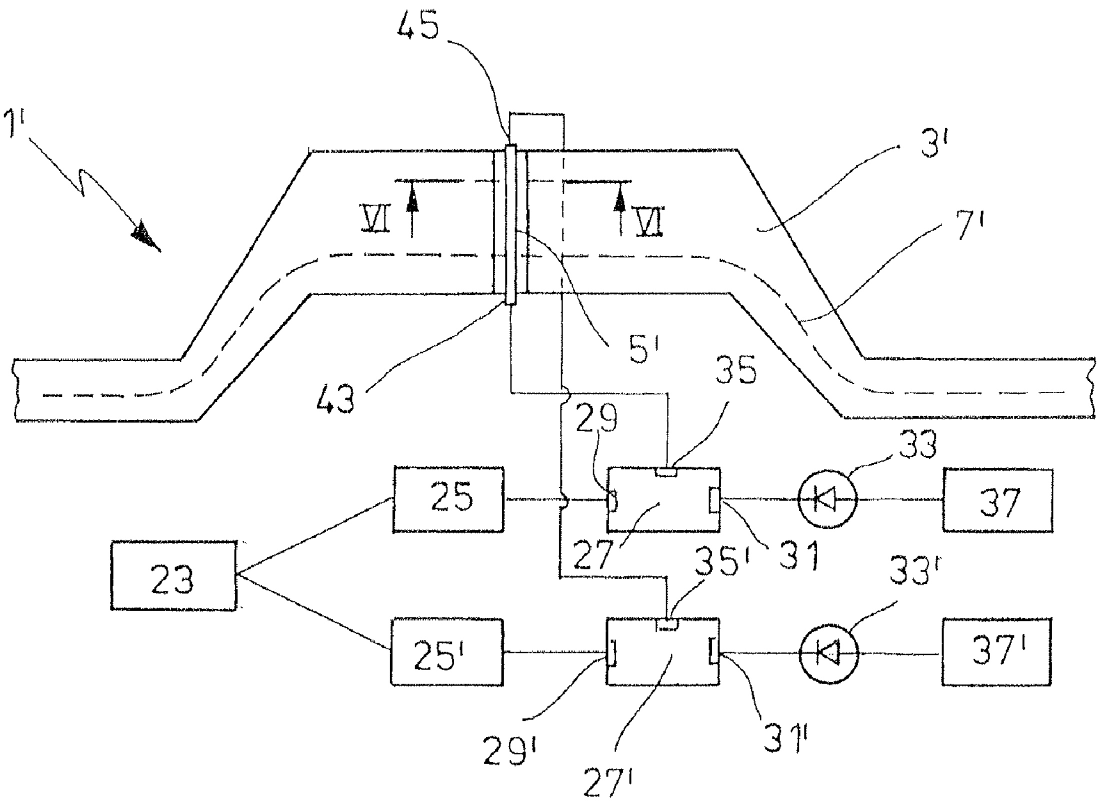
FIG. 5 shows a second embodiment of an inventive beam analyzing system for analyzing a particle beam.
Figure 6:
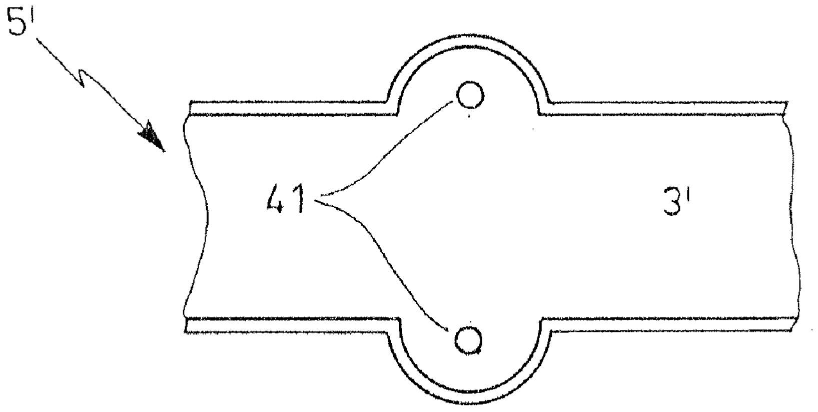
FIG. 6 shows a cross-sectional view along the line VI-VI in FIG. 5.

In FIGS. 5 and 6 there is a second embodiment of the present invention shown, wherein the beam analyzing system 1' illustrated therein serves for determining the spatial position of the beam pulses.

There is in this second embodiment an electrode system 5' arranged in a beam pipe section 3', wherein the electrode system 5' comprises in this insofar preferred embodiment two electrode elements 41 transversely extending with respect to the direction 7' of the beam pulses and having a first end 43 and a second end 45.

Besides the unit 23 for generating a pulsed reference laser beam the beam analyzing system 1' comprises furthermore a first measuring leg comprising a first delay unit 25, a first electro-optical modulator 27, a first readout photo detector 33 and a first signal processing unit 37 which are connected with each other as described in connection with the first embodiment. Moreover, there is analogously provided a second measuring leg comprising a second delay unit 25', a second electro-optical modulator 27', a second readout photo detector 33' and a second signal processing unit 37'. With this setup the pulsed reference laser pulse is split up into a first and a second pulsed reference laser beam.

The signal input 35 of the first electro-optical modulator 27 is connected with the first end 43 of the electrode element 41 and the second end 45 is connected with the second electro-optical modulator 27'. But is possible, though, that both first ends 43 are connected with the first modulator and both second ends 45 are connected with the second modulator 27'.

For determining the position of the beam pulses perpendicular to the beam direction 7' following the method for analyzing a beam with the beam analyzing system 1' according to the second embodiment one proceeds as follows.

At the first and the second ends 43, 45 of the electrode elements 41 first and second, respectively, voltage pulses are output when a beam pulse passes the electrode system 5', wherein the voltage pulses show a shape similar to that of FIG. 3 such that a zero-point and a monotonously rising or falling range are present.

The beam analyzing system 1' is adjusted by means of the delay units 25, 25' such that in both electro-optical modulators 27, 27' the zero-point of the voltage pulse exactly coincides with a reference laser pulse when a beam pulse passes the beam pipe section at a transversal reference position. So, corresponding nominal values of the phasings are adjusted. In these cases the intensity of the laser pulses are not modulated by the modulators 27, 27' with respect to the pre-adjusted level.

However, if the beam pulse passes the beam pipe section 5' at another transversal position the zero-points do not coincide any more with the reference laser pulse as the voltage pulses output at the ends 43, 45 are shifted in time with respect to those that are induced when the particle beam pulse passes the beam pipe section 5' at the transversal reference position. This time shift of the voltage pulses and the associated shift of the phasings results in that the laser pulses are then modulated in the intensity by the electro-optical modulators 27, 27' with respect to the pre-adjusted level, wherein the modulation of the intensity is a measure for the shift of the transversal position of the particle beam pulse from the reference position.

Therein, the first and second delay units 25, 25' may initially serve for defining the transversal reference position. Furthermore, the delay units 25, 25' serve for taking into account the phasing of the particle beam pulses relative to the pulsed reference laser beam in such a way that the zero-points of the voltage pulses actually coincide with the laser pulses 39 when a particle beam passes the beam pipe section 3' at the transversal reference position. That is to say if the phasing of the particle beam pulses fluctuates relative to the reference signal the effect that the zero-points shift relative to the reference signal occurs as described in connection with the determination of the arrival time. Thereby, a variation of the phasing may be accounted for by using the delay units 25, 25'.

In the FIGS. 7 to 10 there is another preferred embodiment of the inventive beam analyzing system and the method for determining the timing of a pulsed laser beam relative to a reference signal shown, wherein voltage pulses are generated by a laser beam 50 in a photo detector 49 as the detector unit. Furthermore, a method is displayed, wherein the voltage pulses generated by the laser beam 50 in the photo detector 49 comprise a first and a second shoulder and the pulsed reference beam is split up into a first pulsed reference laser beam 39 and a second pulsed reference laser beam 39'. The phasing of the first pulsed reference laser beam 39 is adjusted such that the first shoulder of the voltage pulse is sampled and the phasing of the second pulsed reference laser beam 39' is adjusted such that the second shoulder of the voltage pulse is sampled. The intensity of the first pulsed reference laser beam 39 and the second pulsed reference laser beam 39' are modulated by the voltage pulses, wherein the intensities of the modulated reference laser pulses are measured and the phasing of the voltage pulses relative to the first reference laser pulses is determined from the intensity of the modulated first reference laser pulses and phasing of the voltage pulses relative to the second reference laser pulses is determined from the intensity of the modulated second reference laser pulses.

Figure 7:
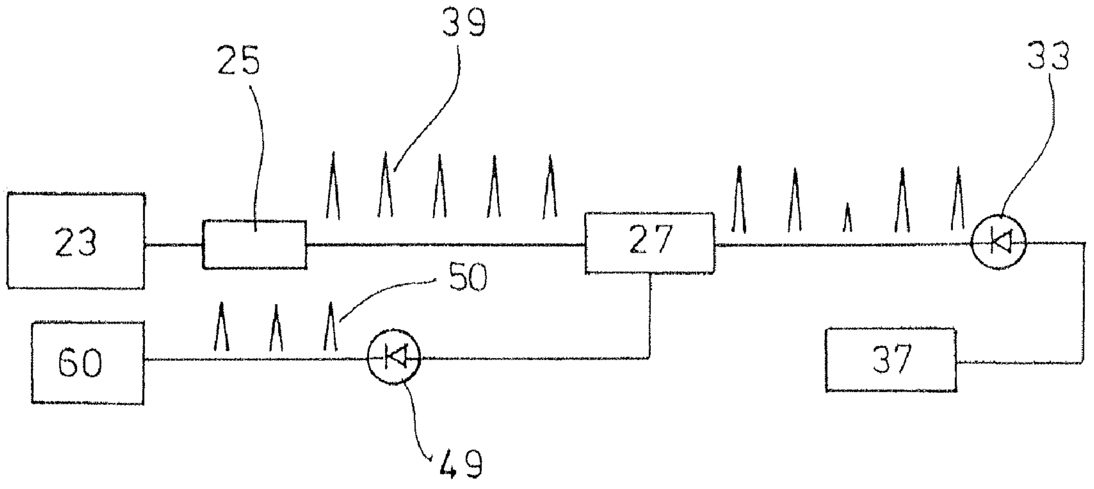
FIG. 7 shows a schematic illustration of the method for analyzing a laser beam.

In particular, FIG. 7 shows an embodiment of the invention for analyzing a laser beam. The laser beam to be analyzed is generated in a system 60 and comprises laser beam pulses 50 which hit completely or partially on a photo detector 49 serving as the detector unit. In analogy to the method described in FIG. 4 the voltage pulses generated in the photo detector 49 are used for the modulation of the reference pulses 39 by the modulator 27 and the modulated reference laser beam is read out by means of a readout photo detector 33 and a signal processing unit 37.

Figure 8:
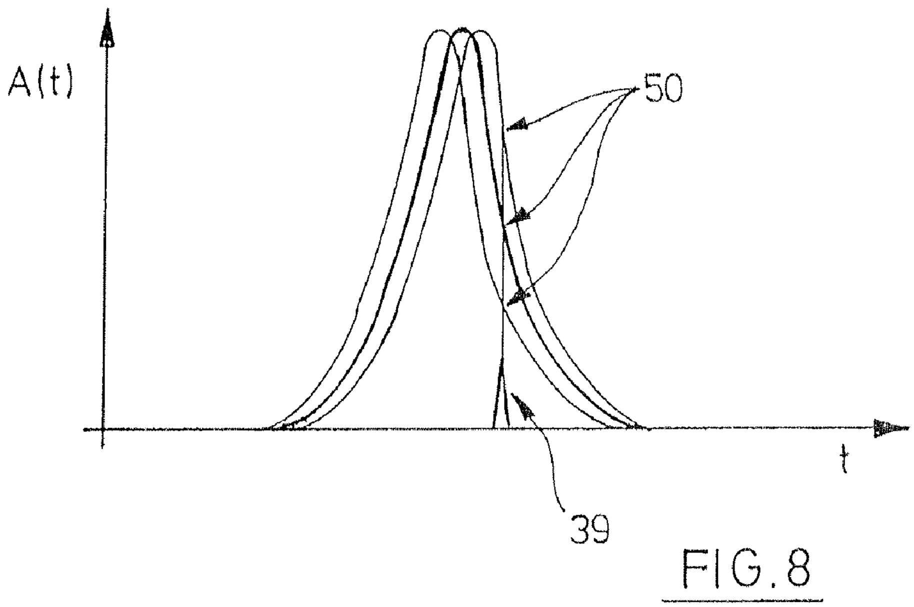
FIG. 8 shows a graph of the timing of a voltage pulse output by a photo detector, where the voltage pulse is sampled at one shoulder by a reference laser pulse.

FIG. 8 shows the amplitude A(t) of a laser beam 50 to be analyzed according to the embodiment described in FIG. 7 as a function of time with three different phasings. The reference laser pulse 39 is illustrated as well such that it becomes obvious how different amplitude modulations of the reference laser beam result from the respective different phasings. In this case the phasing of the laser pulse shown in the middle in FIG. 8 corresponds to the nominal value. If therefore, as in this example, the right shoulder of the laser pulse 50 is sampled the amplitude of the modulated reference laser pulses 39 is higher than at the nominal value when the laser pulse 50 is early with respect to the nominal value and lower when the laser pulse 50 is late with respect to the nominal value.

Figure 9:
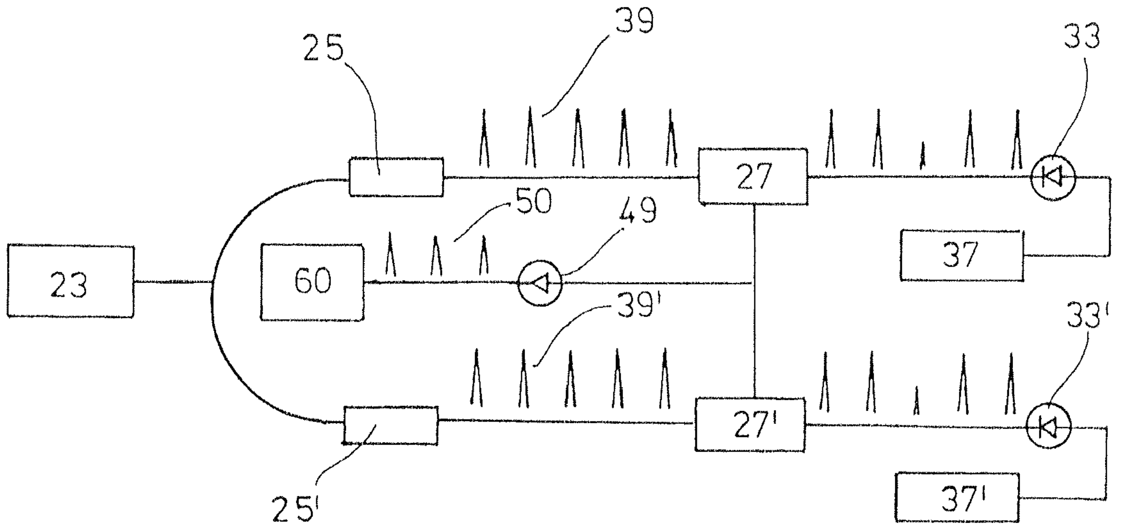
FIG. 9 shows a second embodiment of an inventive beam analyzing method.

FIG. 9 shows another embodiment of the invention for analyzing a laser beam. Here, the misinterpretation of amplitude fluctuations of the laser beam 50 to be analyzed as shifts in arrival time are prevented by splitting up the reference laser beam in a first reference laser beam 39 and a second reference laser beam 39' and using them both for analyzing the laser beam 50. There are arranged delay units 25 and 25' at the reference laser beams 39 and 39', respectively, such that an independent adjustment of the phasing of the respective reference laser beams 39, 39' is possible. In analogy to the embodiment described in FIG. 5 two modulators 27 and 27' modulate the reference laser pulses 39 and 39', respectively, wherein the laser pulses 50 to be analyzed generate voltage pulses in the photo detector 49 which are conveyed to the modulators 27 and 27'. The readout photo detectors 33 and 33' and the signal processing units 37 and 37' read out the modulated reference laser pulses.

Figure 10:
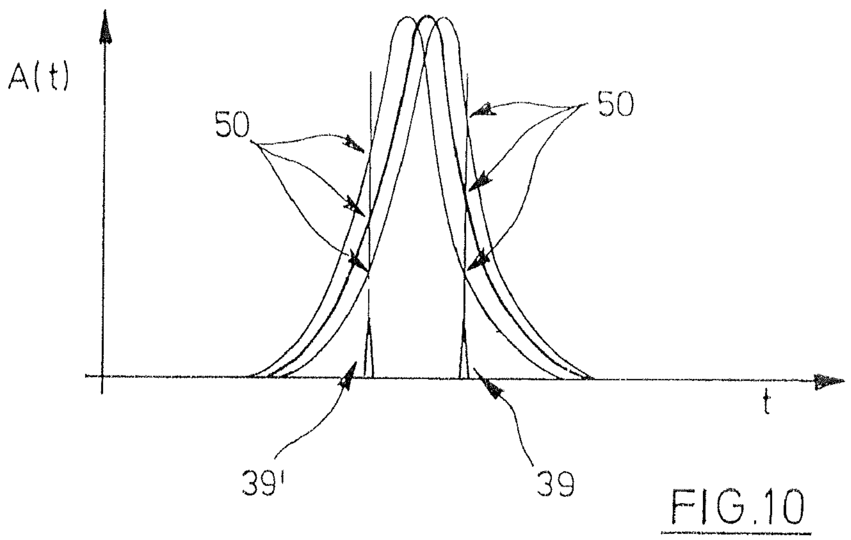
FIG. 10 shows a graph of the timing of a voltage pulse output by a photo detector, where the voltage pulse is sampled at both shoulders by two reference laser pulses.

FIG. 10 shows in analogy to FIG. 8 the amplitude A(t) of a laser beam 50 to be analyzed according to the embodiment described in FIG. 9 as a function of time with three different phasings. Here, the phasings of the reference laser pulses 39 and 39' are adjusted such that the first reference laser pulses 39 sample the right shoulder of the laser pulse 50 to be analyzed and the second reference laser pulses 39' sample the right shoulder. It becomes obvious that an up/down amplitude fluctuation of the laser beam 50 results in a symmetrical rise/fall of the amplitude of the modulated reference laser beam pulses that are read out in the signal processing units 37 and 37'. However, a shift in the phasing of the laser beam 50 to be analyzed results in an asymmetrical variation in the amplitude of the reference laser pulses. With a forward shift in time the amplitude of the modulated signal of the first reference laser pulses 39 rises whereas the amplitude of the modulated signal of the second reference laser pulses 39' fall. With a backward shift in time it behaves vice versa. This embodiment has therefore the advantage that amplitude fluctuations can be distinguished from shifts in the arrival time. Furthermore, it provides a redundancy by using two independent measurements which protects the system against failure and reduces the measurement error.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A beam analyzing system comprising:

a unit for generating a pulsed reference laser beam;

a first electro-optical modulator including an optical input, an optical output, and a signal input;

a first readout photo detector; and a detector unit, said optical input being connected with the unit for generating a pulsed reference laser beam, said optical output being connected with the first readout photo detector, said signal input being connected with the detector unit.

2. The beam analyzing system according to claim 1; and a first delay unit interposed between the unit and the optical input for adjusting a delay time for the pulsed reference laser beam.

3. The beam analyzing system according to claim 1; and a beam pipe section, said detector unit comprising an electrode system arranged in the beam pipe section and designed such that a voltage pulse is induced when a particle beam pulse passes the electrode system.

4. The beam analyzing system according to claim 3, said electrode system comprising an annular bracket and electrode elements, said electrode elements being electrically insulated with respect to the bracket, said annular bracket comprising radial bores, said electrode elements being formed as bolts extending inside the bores, a portion of said bolts facing the particle beam and presenting an essentially constant diameter, said electrode system including insulating bushes, with the bolts being retained by the insulating bushes in the bores.

5. The beam analyzing system according to claim 3, said electrode system comprising an electrode element extending transversely with respect to a direction of the particle beam pulses, with the electrode element comprising a first end and a second end;

a second electro-optical modulator including another optical input, another optical output, and another signal input; and a second readout photo detector, said another optical input being connected with the unit for generating a pulsed reference laser beam, said another optical output being connected with the second readout photo detector, said first end being connected with the signal input, said second end being connected with the signal input.

6. The beam analyzing system according to claim 5; and a second delay unit interposed between the unit and the another optical input for adjusting a delay time for the pulsed reference laser beam.

7. The beam analyzing system according to claim 1 and;

a beam pipe section comprising a resonator.

8. The beam analyzing system according to claim 1, said detector unit comprising a photo detector, said photo detector being arranged and designed such that a voltage pulse is generated when a laser beam pulse hits the photo detector.

9. The beam analyzing system according to claim 8;

a second electro-optical modulator including another optical input, another optical output, and another signal input; and a second read-out photo detector, said another optical input being connected with the unit for generating a pulsed reference laser beam, said another optical output being connected with the second readout photo detector, said photo detector including a detector signal output, said detector signal output being connected with the signal input and the another signal input.

10. A method for analyzing a pulsed particle or laser beam, the method comprising the steps of:

(a) generating first voltage pulses by means of a detector unit;

(b) modulating the intensity of a pulsed reference laser beam by the first voltage pulses;

(c) measuring the intensity of the modulated reference laser pulses; and (d) determining the phasing of the first voltage pulses relative to the reference laser pulses from the intensity of the modulated reference laser pulses.

11. The method according to claim 10, (e) determining the timing of the pulses of the particle or laser beam from the phasing relative to the reference laser pulses.

12. The method according to claim 11, (e) adjusting a nominal value for the phasing of the pulsed reference laser beam relative to the pulsed particle or laser beam.

13. The method according to claim 10, step (a) including the step of inducing the voltage pulses in an electrode system by a particle beam.

14. The method according to claim 13, said electrode system comprising an electrode element extending transversely with respect to a direction of the particle beam pulses, with the electrode element comprising a first end and a second end, step (a) including the step of inducing the first voltage pulses at the first end and second voltage pulses at the second end by the particle beam, (e) splitting the pulsed reference laser beam into the first-mentioned pulsed reference laser beam and a second pulsed reference laser beam, step (b) including the step of modulating the intensity of the second pulsed reference laser beam by the second voltage pulses, step (c) including the step of measuring the second modulated reference laser beam, step (d) including the step of determining the phasing of the first voltage pulses relative to the first reference laser pulses from the intensity of the modulated first reference laser pulses, step (d) including the step of determining the phasing of the second voltage pulses relative to the second reference laser pulses from the intensity of the modulated second reference laser pulses.

15. The method according to claim 14, (f) determining a transversal position of the particle beam in the beam pipe section from the phasings.

16. The method according to claim 14, (f) adjusting a first nominal value of to phasing of to first reference laser pulse relative to the particle beam.

17. The method according to claim 16, (f) adjusting a second nominal value of the phasing of the second reference laser pulse relative to the particle beam.

18. The method according to claim 10, (e) inducing the voltage pulses by an accelerator field for the particle beam.

19. The method according to claim 18, (f) determining the phasing or the amplitude of the accelerator field relative to the reference laser pulses from the phasing of the voltage pulses relative tote reference laser pulses.

20. The method according to claim 10, step (a) including the step of generating the voltage pulses by a laser beam in a photo detector as the detector unit.

21. The method according to claim 20, said voltage pulses generated by the laser beam comprising a first and a second shoulder, (e) splitting the pulsed reference laser beam into a first pulsed reference laser beam and a second pulsed reference laser beam, (f) adjusting the phasing of the first pulsed reference laser beam such that the first shoulder is sampled, (g) adjusting the phasing of the second pulsed reference laser beam such that the second shoulder is sampled, step (b) including the step of modulating the intensities of the first pulsed reference laser beam and the second pulsed reference laser beam by the voltage pulses, step (c) including the step of measuring the intensities of the modulated reference laser pulses, step (d) including the step of determining the phasing of the voltage pulses relative to the first reference laser pulses from the intensity of the modulated first reference laser pulses and the phasing of the voltage pulses relative to the second reference laser pulses from the intensity of the modulated second reference laser pulses.

* * * * *